United States Patent
Brace et al.

(10) Patent No.: US 10,150,336 B2
(45) Date of Patent: Dec. 11, 2018

(54) TIRE WITH THERMOPLASTIC INNERLINER

(71) Applicant: The Goodyear Tire & Rubber Company, Akron, OH (US)

(72) Inventors: Lauren Elizabeth Brace, Chagrin Falls, OH (US); James Gregory Gillick, Akron, OH (US); Xiaojun He, Hackettstown, NJ (US)

(73) Assignee: The Goodyear Tire & Rubber Company, Akron, OH (US)

( * ) Notice: Subject to any disclaimer, the term of this patent is extended or adjusted under 35 U.S.C. 154(b) by 186 days.

(21) Appl. No.: 14/973,883

(22) Filed: Dec. 18, 2015

(65) Prior Publication Data

US 2016/0176232 A1    Jun. 23, 2016

Related U.S. Application Data

(60) Provisional application No. 62/094,318, filed on Dec. 19, 2014.

(51) Int. Cl.
*B32B 1/00* (2006.01)
*B32B 3/30* (2006.01)
(Continued)

(52) U.S. Cl.
CPC ........ *B60C 1/0008* (2013.01); *B29D 30/0005* (2013.01); *B32B 1/00* (2013.01);
(Continued)

(58) Field of Classification Search
CPC ................................ B60C 1/0008; B60C 5/14
See application file for complete search history.

(56) References Cited

U.S. PATENT DOCUMENTS 3,855,168 A    12/1974  Maeda et al.
4,131,584 A    12/1978  Burke, Jr. et al.
(Continued)

FOREIGN PATENT DOCUMENTS

EP    1077341 A1    2/2001
EP    2184323 B1    5/2013
(Continued)

OTHER PUBLICATIONS

Durairaj, Resorcinol Formaldehyde Latex (RFL) Adhesives and Applications, Resorcinol: Chemistry, Technology, and Applications, 2005.*
(Continued)

*Primary Examiner* — Liam J Heincer
(74) *Attorney, Agent, or Firm* — John D. DeLong

(57) ABSTRACT

The present invention is directed to a pneumatic tire comprising a carcass and an innerliner in direct contact with the carcass, the innerliner comprising: a film comprising a blend of a polyamide, an α-olefin graft copolymer, and an ionomer; and an adhesive layer disposed between the film and the carcass, the adhesive layer comprising: a polymeric amine and a resorcinol-formaldehyde-latex (RFL) adhesive. The invention is further directed to a method of building a pneumatic tire comprising the steps of: exposing an innerliner film to a corona discharge to create a corona treated film, the innerliner film comprising a blend of a polyamide, an α-olefin graft copolymer, and an ionomer; disposing a polymeric amine onto the corona treated film to create an amine treated film; disposing a resorcinol-formaldehyde-latex (RFL) adhesive on the amine treated film to create a treated innerliner film; and incorporating the treated innerliner film into a tire build such that the treated innerliner film is in direct contact with a tire carcass.

9 Claims, 1 Drawing Sheet

(51) Int. Cl.

| | | |
|---|---|---|
| *B32B 5/26* | (2006.01) | |
| *B32B 7/12* | (2006.01) | |
| *B60C 1/00* | (2006.01) | |
| *B60C 5/14* | (2006.01) | |
| *C08G 8/22* | (2006.01) | |
| *C08L 9/06* | (2006.01) | |
| *B29D 30/00* | (2006.01) | |
| *B32B 25/08* | (2006.01) | |
| *B32B 25/10* | (2006.01) | |
| *B32B 25/12* | (2006.01) | |
| *B32B 25/14* | (2006.01) | |
| *B32B 27/08* | (2006.01) | |
| *B32B 27/16* | (2006.01) | |
| *B32B 27/32* | (2006.01) | |
| *B32B 27/34* | (2006.01) | |
| *C08L 23/08* | (2006.01) | |
| *C08L 51/06* | (2006.01) | |
| *C08L 77/02* | (2006.01) | |
| *C09J 161/12* | (2006.01) | |
| *C08L 77/06* | (2006.01) | |

(52) U.S. Cl.
CPC .............. *B32B 3/30* (2013.01); *B32B 5/26* (2013.01); *B32B 7/12* (2013.01); *B32B 25/08* (2013.01); *B32B 25/10* (2013.01); *B32B 25/12* (2013.01); *B32B 25/14* (2013.01); *B32B 27/08* (2013.01); *B32B 27/16* (2013.01); *B32B 27/32* (2013.01); *B32B 27/34* (2013.01); *B60C 1/00* (2013.01); *B60C 5/14* (2013.01); *C08G 8/22* (2013.01); *C08L 77/02* (2013.01); *C08L 77/06* (2013.01); *C09J 161/12* (2013.01); *B32B 2250/44* (2013.01); *B32B 2255/10* (2013.01); *B32B 2255/26* (2013.01); *B32B 2260/021* (2013.01); *B32B 2260/048* (2013.01); *B32B 2270/00* (2013.01); *B32B 2307/54* (2013.01); *B32B 2307/558* (2013.01); *B32B 2307/7242* (2013.01); *B32B 2307/7244* (2013.01); *B32B 2307/732* (2013.01); *B32B 2605/00* (2013.01); *B60C 2005/145* (2013.01)

(56) References Cited

U.S. PATENT DOCUMENTS

| | | | |
|---|---|---|---|
| 4,356,219 A * | 10/1982 | Boon | ............... C08J 5/06 156/910 |
| 4,956,414 A | 9/1990 | Muehlenbernd et al. | |
| 5,278,229 A | 1/1994 | Asano et al. | |
| 5,466,424 A | 11/1995 | Kusano et al. | |
| 6,263,920 B1 | 7/2001 | Hsich | |
| 8,344,064 B2 | 1/2013 | Morooka | |
| 8,372,477 B2 | 2/2013 | Buelow et al. | |
| 8,378,035 B2 | 2/2013 | Kawaguchi et al. | |
| 8,454,778 B2 | 6/2013 | Majumdar et al. | |
| 8,618,225 B2 | 12/2013 | Toufaili | |
| 2005/0239936 A1* | 10/2005 | Winkler | ............... C08J 5/06 524/323 |
| 2009/0242094 A1* | 10/2009 | Kato | ............... B60C 1/0008 152/565 |
| 2011/0241269 A1* | 10/2011 | Siffer | ............... C08J 5/041 267/113 |
| 2011/0305863 A1 | 12/2011 | Morooka | |
| 2012/0279626 A1 | 11/2012 | Incavo | |
| 2013/0078477 A1 | 3/2013 | Shibata | |
| 2013/0101821 A1* | 4/2013 | Jeon | ............... B60O 5/14 428/215 |
| 2013/0171394 A1 | 7/2013 | Chou et al. | |
| 2013/0273358 A1* | 10/2013 | Kwon | ............... B60C 1/0008 428/337 |
| 2014/0099460 A1* | 4/2014 | Brace | ............... B60C 9/00 428/36.8 |
| 2014/0099463 A1* | 4/2014 | Siffer | ............... B60C 9/00 428/36.9 |
| 2014/0150947 A1* | 6/2014 | Shannon | ............... B60C 1/0008 152/510 |
| 2014/0227499 A1* | 8/2014 | Kwon | ............... C09J 7/0264 428/215 |
| 2015/0329744 A1* | 11/2015 | Jeong | ............... C09J 161/12 428/355 AK |
| 2016/0002453 A1* | 1/2016 | Hanley | ............... C08L 23/36 524/229 |
| 2016/0167433 A1* | 6/2016 | Lee | ............... B29D 30/20 152/510 |

FOREIGN PATENT DOCUMENTS

| | | |
|---|---|---|
| EP | 2520446 B1 | 1/2014 |
| JP | H0740702 A | 2/1995 |
| JP | H09165469 A | 6/1997 |
| JP | 2013006387 A | 1/2013 |

OTHER PUBLICATIONS

European Search Report dated Apr. 14, 2016 for Application Serial No. EP 15200530.
Chinese Search Report (not dated) for Application Serial No. 201510951658.5.
Chinese search report dated Mar. 8, 2018.

\* cited by examiner

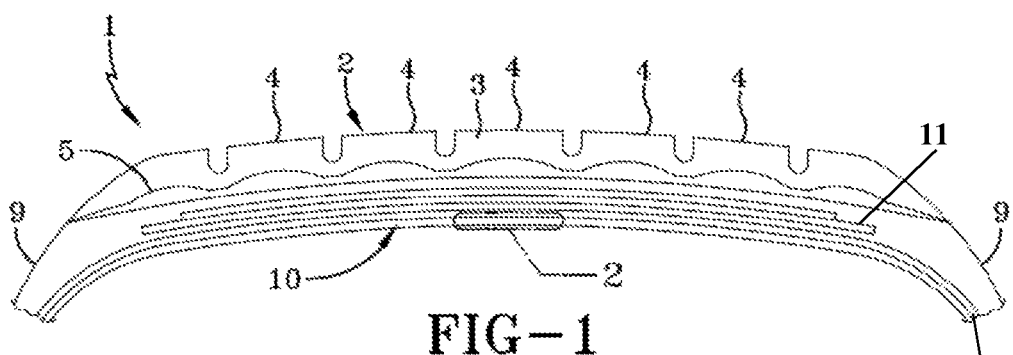
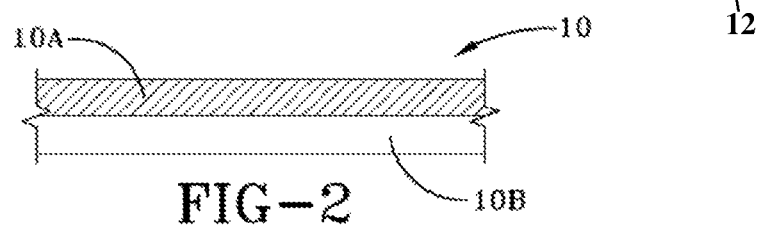

TIRE WITH THERMOPLASTIC INNERLINER

BACKGROUND OF THE INVENTION

Conventionally, barrier layers, usually in a form of innerliners, for pneumatic rubber tires are comprised of butyl or halogenated butyl rubber (e.g. halobutyl rubber) layers which have greater resistance to air, oxygen, and nitrogen permeability than other tire components. Such barrier layers, or innerliners, are provided to inhibit the loss of air or oxygen from the pneumatic tire cavity through the barrier layer into the tire carcass which promotes retention of air, including retention of air pressure, within the pneumatic tire cavity. In order to provide a suitable degree of air or oxygen impermeability, such innerliner layer needs to be sufficiently thick so that it adds significant weight to the tire. Further, an additional rubber layer, sometimes referred to as a tie layer, with low hysteresis loss, added in a manner that it is sandwiched between the barrier layer and the tire carcass.

The thickness of the butyl rubber (e.g. halobutyl rubber) adds significantly to the weight of the tire. Accordingly, alternate thinner materials with low air or oxygen permeability are desired, particularly in a form of thin films, for use as such barrier layers. Various candidates which are relatively impermeable to air or oxygen have heretofore been proposed, including, for example, polyvinylidene chloride, nylon, and polyester. For example, see U.S. Pat. Nos. 5,040,583, 4,928,741. Composites containing such films have been proposed such as, for example, at least one layer of a thin film of such non-elastomeric barrier material sandwiched and bonded between two elastomer layers of elastomeric compositions. Thin films of alloys with a resistance to air and/or oxygen permeability have also been proposed for a tire innerliner layer comprised of a mixture of thermoplastic resin, elastomer and, optionally, a binder resin to enhance the compatibility between the thermoplastic resins and elastomers.

There remains a need for an innerliner material that can be significantly thinner than their conventional butyl rubber-based counterpart tire innerliners and can therefore provide a substantial tire weight savings.

SUMMARY OF THE INVENTION

The present invention is directed to a pneumatic tire comprising a carcass and an innerliner in direct contact with the carcass, the innerliner comprising: a film comprising a blend of a polyamide, an α-olefin graft copolymer, and an ionomer; and an adhesive layer disposed between the film and the carcass, the adhesive layer comprising: a polymeric amine and a resorcinol-formaldehyde-latex (RFL) adhesive.

The invention is further directed to a method of building a pneumatic tire comprising the steps of: exposing an innerliner film to a corona discharge to create a corona treated film, the innerliner film comprising a blend of a polyamide, an α-olefin graft copolymer, and an ionomer; disposing a polymeric amine onto the corona treated film to create an amine treated film; disposing a resorcinol-formaldehyde-latex (RFL) adhesive on the amine treated film to create a treated innerliner film; and incorporating the treated innerliner film into a tire build such that the treated innerliner film is in direct contact with a tire carcass.

BRIEF DESCRIPTION OF THE DRAWINGS

The figures contained in the accompanying drawings, which are incorporated in and constitute a part of this specification, are presented to illustrate several embodiments of the invention.

FIG. 1 is a cross-sectional view of a portion of pneumatic tire with an innerliner layer.

FIG. 2 is an enlarged partial cross-sectional views of the pneumatic tire of FIG. 1 taken within the area 2.

DESCRIPTION

There is disclosed a pneumatic tire comprising a carcass and an innerliner in direct contact with the carcass, the innerliner comprising: a film comprising a blend of a polyamide, an α-olefin graft copolymer, and an ionomer; and an adhesive layer disposed between the film and the carcass, the adhesive layer comprising: a polymeric amine and a resorcinol-formaldehyde-latex (RFL) adhesive.

There is further disclosed a method of building a pneumatic tire comprising the steps of: exposing an innerliner film to a corona discharge to create a corona treated film, the innerliner film comprising a blend of a polyamide, an α-olefin graft copolymer, and an ionomer; disposing a polymeric amine onto the corona treated film to create an amine treated film; disposing a resorcinol-formaldehyde-latex (RFL) adhesive on the amine treated film to create a treated innerliner film; and incorporating the treated innerliner film into a tire build such that the treated innerliner film is in direct contact with a tire carcass.

FIG. 1 depicts a section of a pneumatic tire (1) comprised of a tread (2) of a cap/base construction comprised of an outer tread cap rubber layer (3) with running surface (4) and an underlying tread base rubber layer (5), tread reinforcing belts (11) and supporting carcass with a rubberized fabric ply layer (12), sidewalls (9) and innerliner (10), as the radially innermost layer of the tire which is designed to inhibit the passage, or permeation, of air and oxygen through the barrier layer to promote air retention within the pneumatic tire cavity.

FIG. 2 depicts an enlarged portion of the innerliner layer (10) as a composite of thermoplastic film air/oxygen barrier layer (10B) bonded to an adhesive layer (10A). The innerliner layer (10) has adhesive (10A) on the surface of the barrier film (10B) to bond the barrier film (10B), and thereby the innerliner layer (10) to the surface of the tire ply layer (12) of the tire carcass.

The blend used in the film include a polyamide. The polyamide material in the blend may be any conventional polyamide material and includes aliphatic polyamide polymers such as, but not limited to, polyhexamethylene adipamide (nylon 66), polycaprolactam (nylon 6), polybutyrolactam (nylon 4), poly(9-aminononanoic acid) (nylon 9), polyenantholactam (nylon 7), polycapryllactam (nylon 8), polyhexamethylene sebacamide (nylon 6, 10), nylon 6,66 (copolymer of hexamethylene adipamide and caprolactam), polyamide 6/12, polyamide 11, polyamide 12, and nylon-MXD6.

The blend used in the film also includes an α-olefin graft copolymer. In one embodiment, the α-olefin graft copolymer includes an ethylene-α-olefin copolymer. Examples of the grafted ethylene-α-olefin copolymer include an ethylene-propylene copolymer, an ethylene-butene copolymer, an ethylene-hexene copolymer and an ethylene-octene copolymer. In one embodiment, the α-olefin graft copolymer is a copolymer of ethylene and a second α-olefin, and the α-olefin graft copolymer is grafted with an anhydride of an α, β-unsaturated carboxylic acid. In one embodiment, α-olefin graft copolymer is a copolymer of ethylene and 1-octene and is grafted with maleic anhydride. The α-olefin graft copolymer can be produced, for example, by reaction of an acid anhydride and peroxide with an α-olefin copolymer. Additionally, the α-olefin graft copolymer having an acid anhydride group is commercially available.

The blend used in the film also includes an ionomer. In one embodiment, the ionomer is an at least partially neutralized salt of a copolymer of ethylene and an α, β-unsaturated monocarboxylic acid. In one embodiment, the ionomer is an at least partially neutralized zinc salt of a copolymer derived from ethylene and methacrylic acid.

The blend used in the film includes a mixture of the polyamide, α-olefin graft copolymer, and ionomer. In one embodiment, the blend includes from 50 to 70 parts by weight of polyamide, from 10 to 30 parts by weight of the α-olefin graft copolymer, and from 10 to 30 parts by weight of the ionomer. The blend may be prepared by mixing using any of the methods as are known in the art, including but not limited to extrusion with a single or twin screw extruder.

The blend is used in the form of a film. Suitable films may be prepared using techniques as are known in the art, including extrusion. The film may have a thickness ranging from 6 to 10 mils (0.15 to 0.25 mm)

The film is treated to promote adhesion to a rubber compound, such as those present in a pneumatic tire including a carcass plycoat compound. While the following describes treatment to one side of a film, it is understood that both sides of the film may be treated in the same way to allow for adhesion of both sides of the film to rubber, as may occur in the splice area of an innerliner and carcass as disclosed for example in U.S. Pat. No. 8,454,778.

The film may first be exposed to a corona discharge, using techniques as are known in the art, for example as disclosed in U.S. Pat. No. 5,466,424.

Corona discharge is well known by those of ordinary skill in the art and can be readily adapted for use according to the invention based on the disclosure herein. Corona discharge typically involves an electrical discharge that causes oxygen or other gas molecules within the discharge area to break into their atomic form, leaving them free to bond onto molecules on the surface of the treated article.

The film may further be treated with a polymeric amine. Suitable polymeric amines include but are not limited to polyethyleneimine, polypropyleneimine, polyvinylamine, and polyoxyalkylene amines.

In one embodiment, the polymeric amine is a polyethyleneimine.

In certain embodiments, the PEI has a weight average molecular weight (Mw) of from about 800 to about 2,100,000 , alternatively from about 1,000 to about 20,000 , alternatively from about 2,000 to about 4,000 , alternatively from about 1,000 to about 4,000 , alternatively from about 10,000 to about 1,000,000 , alternatively from about 100,000 to about 1,000,000 , alternatively from about 500,000 to about 1,000,000 , alternatively from about 700,000 to about 800,000 , g/mol. The PEI is typically water soluble. As such, in certain embodiments, the PEI is included in a dispersion or emulsion which comprises from about 2 to about 99 , alternatively from 4 to about 20 , parts by weight PEI, remainder water. In other embodiments, the PEI is a resin.

In certain embodiments, the PEI has a pH of from about 11 to about 12 . The PEI can have a high charge density, such as from about 8 to 16 meq/g TS.

In a preferred embodiment the polymeric amine comprises PEI having a Mw of from about 700,000 to about 800,000 , a pH of from about 10 to about 12 , a pour point of from about 0 to about −5° C. and a specific gravity of about 1 to about 1.3 g/cm3 . In this embodiment the cationic polymer comprises about 50% solids and can be diluted, e.g. diluted to 5% solids, prior to application to the base layer.

Suitable polyethyleneimine is available commercially as Lupasol from BASF.

In one embodiment, the polymeric amine is a polyvinylamine. In certain embodiments, the polyvinylamine has a Mw of about 340,000 , a density of about 1.08 g/ml, a pH of from about 7 to about 9 , and a viscosity of about 5,000 mPas or greater at 20° C. Suitable polyvinyl amine is available commercially as Lupamine from BASF.

In one embodiment, the polymeric amine is a polyoxyalkylene amine. The polyoxyalkylene amine can include a polyoxyalkylene monoamine, diamine, triamine, or combinations thereof. These compounds are defined by an amino group attached to a terminus of a polyether backbone and, thus, are considered polyether amines. The amino group is a primary amino group. Depending upon whether the polyoxyalkylene amine is a mono-, di-, or triamine, each compound can contain, respectively, one, two, or three amino groups, e.g. primary amino groups, with each group being attached to the terminus of a polyether backbone. Accordingly, one or more polyether backbones may be necessary to accommodate the number of terminal amino groups. Further description of polyoxyalkylene amines and their use is as disclosed in U.S. Pat. No. 7,714,051 , fully incorporated herein by reference. Suitable polyoxyalkylene amines include polyoxyalkylene mono-, di-, and triamines commercially available from Huntsman Chemical of The Woodlands, Tex. and sold under the tradename JEFFAMINE®.

The polymeric amine may be applied to the film by methods as are known in the art, including but not limited to Mayer rod and gravure roll.

The polymeric amine may be applied to the film from a water dispersion containing 0.5% solids. The dry coat weight of polymeric amine is 0.04 gram/m2 based on the area of the film. The thickness is in the Angstrom range.

In some embodiments, the polymeric amine is present on the film in an amount of from about 0.01 to about 0.5 , alternatively from about 0.01 to about 0.1 , g/m$^2$ (on a surface of the film). Further, it is to be appreciated that more than one polymeric amine may be included on the film, in which case the total amount of all polymeric amine present on the film is within the above ranges. Of course, the ranges above may vary in embodiments where the polymeric amine is included in a dispersion, emulsion, etc., because of the additional water and other solvents included in such embodiments.

The film may be further treated with an aqueous RFL emulsion comprising a resorcinol-formaldehyde resin, and one or more elastomer latexes.

In one embodiment, the RFL may include the resorcinol formaldehyde resin, a styrene-butadiene copolymer latex, a vinylpyridine-styrene-butadiene terpolymer latex, and a blocked isocyanate.

In a treatment step, the film is dipped in an RFL liquid. In one embodiment, the RFL adhesive composition is comprised of (1) resorcinol, (2) formaldehyde and (3) a styrene-butadiene rubber latex, (4) a vinylpyridine-styrene-butadiene terpolymer latex, and (5) a blocked isocyanate. The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are considerably superior to other condensation products in the adhesive mixture.

The resorcinol may be dissolved in water to which around 37 percent formaldehyde has been added together with a strong base such as sodium hydroxide. The strong base should generally constitute around 7.5 percent or less of the resorcinol, and the molar ratio of the formaldehyde to resorcinol should be in a range of from about 1.5 to about 2 . The aqueous solution of the resole or condensation product or resin is mixed with the styrene-butadiene latex and vinylpyridine-styrene-butadiene terpolymer latex. The resole or other mentioned condensation product or materials that form said condensation product should constitute from 5 to 40 parts and preferably around 10 to 28 parts by solids of the latex mixture. The condensation product forming the resole or resole type resin forming materials should preferably be partially reacted or reacted so as to be only partially soluble in water. Sufficient water is then preferably added to give around 12 percent to 28 percent by weight overall solids in the final dip. The weight ratio of the polymeric solids from the latex to the resorcinol/formaldehyde resin should be in a range of about 2 to about 6.

The RFL adhesive may include a blocked isocyanate. In one embodiment from about 1 to about 8 parts by weight of solids of blocked isocyanate is added to the adhesive. The blocked isocyanate may be any suitable blocked isocyanate known to be used in RFL adhesive dips including, but not limited to, caprolactam blocked methylene-bis-(4-phenylisocyanate), such as Grilbond-IL6 available from EMS American Grilon, Inc., and phenol formaldehyde blocked isocyanates as disclosed in U.S. Pat. Nos. 3,226,276; 3,268,467; and 3,298,984; the three of which are fully incorporated herein by reference. As a blocked isocyanate, use may be made of reaction products between one or more isocyanates and one or more kinds of isocyanate blocking agents. The isocyanates include monoisocyanates such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocyanate, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4diisocyanate, diphenylethane diisocyanate, 1,5-naphthalene diisocyanate, etc., and triisocyanates such as triphenylmethane triisocyanate, diphenylmethane triisocyanate, etc. The isocyanate blocking agents include phenols such as phenol, cresol, and resorcinol, tertiary alcohols such as t-butanol and t-pentanol, aromatic amines such as diphenylamine, diphenylnaphthylamine and xylidine, ethyleneimines such as ethylene imine and propyleneimine, imides such as succinic acid imide, and phthalimide, lactams such as ε.-caprolactam, δ-valerolactam, and butyrolactam, ureas such as urea and diethylene urea, oximes such as acetoxime, cyclohexanoxime, benzophenon oxime, and α-pyrolidon.

The polymers may be added in the form of a latex or otherwise. In one embodiment, a vinylpyridine-styrene-butadiene terpolymer latex and styrene-butadiene rubber latex may be added to the RFL adhesive. The vinylpyridine-styrene-butadiene terpolymer may be present in the RFL adhesive such that the solids weight of the vinylpyridine-styrene-butadiene terpolymer is from about 50 percent to about 100 percent of the solids weight of the styrene-butadiene rubber; in other words, the weight ratio of vinylpyridine-styrene-butadiene terpolymer to styrene-butadiene rubber is from about 1 to about 2.

In a further treatment step, after dipping in the RFL the film may be dipped in a latex of natural rubber grafted with polymethylmethacrylate (NR-PMMA). Such a natural rubber latex comprises a graft polymer which is produced by grafting methyl methacrylate onto natural rubber. In various embodiments, the natural rubber having methyl methacrylate grafted thereon can have a natural rubber to methyl methacrylate weight ratio of from about 20:1 to 1:5 , alternatively from about 5:1 to 1:5 , alternatively from about 5:1 to about 2:1 . Further, in such embodiments, the natural rubber latex can have a total solids of from about 5 to about 50 weight percent, alternatively from about 10 to about 45 weight percent, and/or a pH of greater than about 7 , alternatively greater than about 10.

The adhesive treated film is incorporated into a tire build for use as an innerliner in a pneumatic tire. Incorporation of the film may be accomplished using methods as are known in the art. In one embodiment, the adhesive treated film may be applied to the rubber plycoat of a tire carcass ply, with the treated side of the innerliner in direct contact with the rubber plycoat.

The rubber composition of the plycoat, as well as rubber compositions used in other components of the tire, includes one or more rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Representative synthetic polymers are the homopolymerization products of butadiene and its homologues and derivatives, for example, methylbutadiene, dimethylbutadiene and pentadiene as well as copolymers such as those formed from butadiene or its homologues or derivatives with other unsaturated monomers. Among the latter are acetylenes, for example, vinyl acetylene; olefins, for example, isobutylene, which copolymerizes with isoprene to form butyl rubber; vinyl compounds, for example, acrylic acid, acrylonitrile (which polymerize with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Specific examples of synthetic rubbers include neoprene (polychloroprene), polybutadiene (including cis-1,4-polybutadiene), polyisoprene (including cis-1,4-polyisoprene), butyl rubber, halobutyl rubber such as chlorobutyl rubber or bromobutyl rubber, styrene/isoprene/butadiene rubber, copolymers of 1,3-butadiene or isoprene with monomers such as styrene, acrylonitrile and methyl methacrylate, as well as ethylene/propylene terpolymers, also known as ethylene/propylene/diene monomer (EPDM), and in particular, ethylene/propylene/dicyclopentadiene terpolymers. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely, a bound styrene content of about 30 to about 45 percent.

By emulsion polymerization prepared E-SBR, it is meant that styrene and 1,3-butadiene are copolymerized as an aqueous emulsion. Such are well known to those skilled in such art. The bound styrene content can vary, for example, from about 5 to about 50 percent. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

In one embodiment, cis1,4-polybutadiene rubber (BR) may be used. Such BR can be prepared, for example, by organic solution polymerization of 1,3-butadiene. The BR may be conveniently characterized, for example, by having at least a 90 percent cis1,4-content.

The cis1,4-polyisoprene and cis1,4-polyisoprene natural rubber are well known to those having skill in the rubber art.

In one embodiment, the rubber composition may include from 10 to 90 phr of the functionalized elastomer, and from 90 to 10 phr of additional rubbers or elastomers containing olefinic unsaturation The term "phr" as used herein, and according to conventional practice, refers to "parts by weight of a respective material per 100 parts by weight of rubber, or elastomer."

The rubber composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts,* 2003, 62nd edition, published by the Institute of Petroleum, United Kingdom.

The rubber composition may include from about 10 to about 150 phr of silica. In another embodiment, from 20 to 80 phr of silica may be used.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 80 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Commonly employed carbon blacks can be used as a conventional filler in an amount ranging from 10 to 150 phr. In another embodiment, from 20 to 80 phr of carbon black may be used. Representative examples of such carbon blacks include N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), crosslinked particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639. Such other fillers may be used in an amount ranging from 1 to 30 phr.

In one embodiment the rubber composition may contain a conventional sulfur containing organosilicon compound. In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)$—S—$CH_2CH_2CH_2Si(OCH_2CH_3)_3$, which is available commercially as NXT™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE 1

Polyamide Compositions 1-5 are according to the subject disclosure. The formulas of the Polyamide Compositions 1-5 are set forth in Table 1 below. The Polyamide Compositions, including a polyamide, an anhydride-functional copolymer reactive with the polyamide, an ionomer, and the other components, e.g. copolymers, synthetic wax, etc. are compounded with a twin screw extruder Immediately following compounding/extrusion the Polyamide Compositions are pelletized. Once pelletized, the Polyamide Compositions are dried and extruded into test sheets using a single screw extrusion cast film line and corona treated at a voltage of 0.09 kV and a line speed of 15 min/sec (residence time is <1 second). The polyamide and the anhydride-functional copolymer react during compounding and the subsequent extrusion and heating processes to form an article.

Referring now to Table 1, the amount and type of each component included in Polyamide Compositions 1-5 is indicated with all values in parts by weight based on 100 parts by weight of each Polyamide Composition.

TABLE 1

| | Composition 1 | Composition 2 | Composition 3 | Composition 4 | Composition 5 |
|---|---|---|---|---|---|
| Polyamide | 58.50 | 49.5 | 49.5 | 49.5 | 49.5 |
| Anhydride-Functional Copolymer 1 | 20.00 | 20 | 10 | 10 | — |
| Anhydride-Functional Copolymer 2 | — | — | — | — | 10 |
| Anhydride-Functional Copolymer 3 | — | — | — | 10 | — |
| Ionomer | 20.00 | 20 | 30 | 30 | — |
| Nano-crystal Polypropylene | — | — | — | — | 10 |
| Copolymer 1 | — | — | 10 | — | — |
| Copolymer 2 | — | 10 | — | 10 | — |
| Copolymer 3 | — | — | — | — | — |
| Synthetic Wax 1 | 0.50 | — | — | — | — |
| Synthetic Wax 2 | 0.50 | — | — | — | 0.5 |
| Synthetic Wax 2 | — | — | — | — | 0.5 |
| Additive 1 | 0.50 | 0.25 | 0.25 | 0.25 | 0.5 |

Polyamide is polyamide 6/66.

Anhydride-functional copolymer 1 is a maleic anhydride modified ethylene-octene copolymer.

Anhydride-functional copolymer 2 is a maleic anhydride modified ethylene-butene copolymer.

Anhydride-functional copolymer 3 is a compatibilizer blend comprising a maleic anhydride modified ethylene-butene copolymer.

Ionomer is a zinc ionomer of ethylene methyacrylic acid copolymer (poly(ethylene-co-methacrylic acid)).

Copolymer 1 is a block copolymer of polyamide 6 and polyether having a melting point of 160° C. when tested in accordance with ISO 11357 and a flexural modulus of about 77 MPa when tested in accordance with ISO 178.

Copolymer 2 is a block copolymer of polyamide 12 and polyether having a melting point of 204° C. when tested in accordance with ISO 11357 and a flexural modulus of about 80 MPa when tested in accordance with ISO 178.

Synthetic Wax 1 is N,N-ethylene bis-stearamide.

Synthetic Wax 2 is sodium stearate.

Synthetic Wax 3 is zinc stearate.

Additive 1 is a thermal stabilizer.

The Polyamide Compositions 1-5 are compounded on a twin-screw, co-rotating extruder to form Base Layers 1-5. As is well known in the art, compounding is a technique to prepare polymeric materials such as that of the base layer. Here, the twin-screw extruder is used to form strands of the base layer. The twin-screw extruder includes two screws that rotate clockwise at a certain speed (RPM) in a metal barrel to move a mixture of components including the polyamide, the anhydride-functional copolymer, the poly(ethylene-co-methacrylic acid) ionomer, and the copolymer and/or synthetic wax. The barrel and screws provides bearing surfaces where shear is imparted to the mixture. Different screw geometries can be used to create the desired amount of shear mixing. Heating media are housed around the barrel and establish temperature zones in the barrel that are varied according to processing conditions known to those of skill in the art; the specific compounding conditions for this example are set forth in Table 2 below. For this example, the individual components of each Polyamide Composition are added to the twin-screw extruder in a first zone (Zone 1) and passed through a series of nine additional zones (Zones 2-10) that are heated to varying temperatures. A vacuum of about 100 mbar is drawn in Zone 8 to remove unwanted volatiles. Then, each compounded Polyamide Composition (Base Layer) is pushed through a strand die to form the strands which are cooled with water and pelletized.

TABLE 2

| Compounding Parameters | |
|---|---|
| Zone 1 Temperature (° C.) | 230 |
| Zone 2 Temperature (° C.) | 230 |
| Zone 3 Temperature (° C.) | 240 |
| Zone 4 Temperature (° C.) | 240 |
| Zone 5 Temperature (° C.) | 250 |
| Zone 6 Temperature (° C.) | 250 |
| Zone 7 Temperature (° C.) | 250 |
| Zone 8 Temperature (° C.) | 260 |
| Zone 9 Temperature (° C.) | 260 |
| Zone 10 Temperature (° C.) | 260 |
| Die Temperature (° C.) | 260 |
| Screw Speed (RPM) | 400 |
| Torque (Amps) | 70 |
| Production Rate (lb./hr.) | 180 |
| Melt Temperature (° C.) | 275 |
| Melt Pressure (PSI) | 150 |

Base Layers 1-5, now pelletized, are subsequently extruded into test sheets on a single screw extruder with cast film die. The test sheets are approximately 0.1 to 0.8 mm thick.

TABLE 3

| Extrusion Parameters | |
|---|---|
| Zone 1 Temperature (° C.) | 270 |
| Zone 2 Temperature (° C.) | 260 |
| Zone 3 Temperature (° C.) | 255 |
| Die Temperature (° C.) | 270 |
| Screw Speed (RPM) | 60 |
| Torque (Amps) | 4 |
| Production Rate (ft./min.) | 8 |
| Melt Temperature (° C.) | 275 |
| Melt Pressure (PSI) | 3200 |

Once extruded, the test sheets of Base Layers 1-4 are tested for Oxygen Permeation Rate. The test results are set forth in Table 4 below.

TABLE 4

| Composition ID | Base Layer ID | Thickness (mils) | $O_2$ Transmission Rate (cc/(100 $in^2$ · day)) |
|---|---|---|---|
| Composition 1 | Base Layer 1 | 6 | 2.72 |
| Composition 2 | Base Layer 2 | 6 | 4.04 |
| Composition 3 | Base Layer 3 | 9 | 3.11 |
| Composition 4 | Base Layer 4 | 7 | 1.72 |

As the results in Table 4 demonstrate, Base Layers 1-4, which are formed in accordance with the subject invention, exhibit excellent $O_2$ transmission resistance.

Once formed, Base Layer 1 is also analyzed to determine Permeation Rate, Tensile Strength at 50% elongation at 23° C., Elongation at Break at 23° C., Izod Impact Strength at 23° C. and −40° C., and melting point. The test methods and the results are set forth in Table 5 below.

TABLE 5

|  | Example 1 |
| --- | --- |
| Permeation Rate (cm³ · mm/(m² · day)) ASTM F3985 | 5.6 |
| Tensile Strength, 50% Elongation, at 23° C. (psi) ASTM D638 | 26 |
| Elongation at Break, at 23° C. (%) ASTM D638 | 501 |
| Izod, 23° C. (kJ/m2) ISO 179 | 112 |
| Izod, −40° C. (kJ/m2) ISO 179 | 138 |
| $T_m$ (° C.) | 198 |

As the results in Table 5 demonstrate, Base Layer 1, which is formed in accordance with the subject invention, exhibits excellent physical properties over a wide range of temperatures. In view of these test results, the composite articles formed can be utilized in various applications which require low permeability, flexibility, and durability over a range of temperatures.

EXAMPLE 2

In this example, the effect of various treatments on the adhesion of a thermoplastic film to rubber is illustrated. The adhesion of a thermoplastic film of a polyamide/α-olefin graft copolymer/ionomer blend to a standard rubber tire carcass plycoat compound was tested. Six film samples were treated using various approaches and tested for adhesion to the rubber compound.

Once Polyamide Composition 1 is compounded and extruded into test sheets of Base Layer 1, the adhesive layer is applied to the test sheets to form the composite articles of Examples 1-14. First, a 5% solids emulsion of polyethyleneimine is diluted with water to 0.5% solids applied using a Mayer rod and is dried for 1 minute at 80° C. to achieve a dry coat weight of 0.04 g/m². Next, each respective adhesive is applied at a thickness of less than 1 mil. Finally, a layer of rubber compound is applied to the adhesive. Once the composite article comprising a base layer and an adhesive layer is formed and the rubber compound is applied, the composite article having the base layer is cured for 23 minutes at 170° C.

The adhesion test consisted of a test of peel strength test to determine the interfacial adhesion between a layer of the film and a layer the rubber compound that were prepared and then cured together for 23 minutes at 170° C. The interfacial adhesion between the layers at 100° C. was determined by pulling the first layer away from the other layer at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing. A description may be found in ASTM D4393 except that a sample width of 2.5 cm is used and a clear Mylar plastic film window of a 5 mm width is inserted between the two test samples.

Prior to preparation of the adhesion test samples, the thermoplastic film was treated according to the following protocols.

Sample 1 included an untreated film of a polyamide/α-olefin graft copolymer/ionomer blend.

Sample 2 included a multilayer film. Polyamide/α-olefin graft copolymer/ionomer blend was coextruded with maleic anhydride grafted styrene-ethylene-butylene copolymer (MA-SEBS) to make a two-layer film, a styrene-isoprene copolymer (SIS) was then extrusion coated on the top of this two-layer film.

Sample 3 included a film treated on both sides first by exposure to a corona discharge, the corona treated film was then exposed to a polyethyleneimine solution and finally dipped in a latex of carboxylated styrene-butadiene rubber.

A hand-held corona treater was used to increase the surface energy of the film made from a polyamide/α-olefin graft copolymer/ionomer blend. The voltage of the hand-held corona treater was between 115V to 230 V, the residence time of corona treater on the sheet was about 8 seconds. To ensure uniform corona treatment over the area of the sheet, the treater was moved in the machine (MD) and trans (TD) directions of the sheet. After corona treatment, the surface energy of the film was checked by Dyne pen to ensure it was in the range from 48 to 56 Dyne/cm.

The corona treated sheet was then coated with polyethyleneimine dispersion (0.5% solid) using a Mayer rod to have a dry coat weight of 0.04 gram/m². The polyethyleneimine dispersion coated sheet was dried at 80° C. for 1 minute.

The sample was finally coated with carboxylated SBR using a Mayer rod, the coated sheet was dried at 100° C. for 5 mins. The dry thickness of adhesive was about 0.75 mil.

Sample 4 included a polyamide/α-olefin graft copolymer/ionomer blend film treated first by exposure to a corona discharge and polyethyleneimine as described for Sample 3, and finally dipped in a latex of carboxylated styrene-butadiene rubber followed by a dip in a latex of natural rubber grafted with polymethylmethacrylate (NR-PMMA) using a Mayer rod. The latex coated film was dried at 120° C. for 5 mins. The dry thickness of the adhesive was about 1 mil.

Sample 5 included a polyamide/α-olefin graft copolymer/ionomer blend film treated first by exposure to a corona discharge and polyethyleneimine as described for Sample 3, and finally dipped in a latex of carboxylated styrene-butadiene rubber followed by a dip in a NR-PMMA latex with standard amounts of curatives added using a Mayer rod. The latex coated film was dried at 120° C. for 5 mins The dry thickness of adhesive was about 1 mil.

Sample 6 included a film treated first by exposure to a corona discharge and polyethyleneimine as described in Sample 3, and finally dipped in an RFL adhesive and hung vertically to remove excess adhesive. The latex coated film was dried at 120° C. for 5 mins The dry thickness of adhesive was about 1 mil.

Sample 7 included a film treated first by exposure to a corona discharge and polyethyleneimine as described in Sample 3, and finally dipped in an RFL adhesive followed by a dip in a NR-PMMA latex and hung vertically to remove excess adhesive.

Each of the treated film samples were prepared for adhesion testing and tested according to the described test. Results are shown in Table 6. As seen in Table 6, the treatment of samples 6 and 7 using the protocol of the present invention resulted in significantly improved adhesion as compared with the other treatments. Sample 7 showed the added benefit of superior green tack as compared with Sample 6.

TABLE 6

| Sample No. | Adhesion, kg/in |
|---|---|
| 1 | 0.5 |
| 2 | 2.5 |
| 3 | 4.3 |
| 4 | 11.7 |
| 5 | 2.5 |
| 6 | 65.4 |
| 7 | 38.2 |

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention, its broader aspects, is therefore not limited to the specific details, representative apparatus and methods and illustrative examples shown and described. Accordingly, departures may be made from such details without departing from the scope or spirit of Applicant's general inventive concept.

What is claimed is:

1. A method of building a pneumatic tire comprising the steps of:
   exposing an innerliner film to a corona discharge to create a corona treated film, the innerliner film comprising a blend of a polyamide, an α-olefin graft copolymer, and an ionomer;
   disposing a polymeric amine onto the corona treated film to create an amine treated film;
   disposing a resorcinol-formaldehyde-latex (RFL) adhesive on the amine treated film to create a RFL-treated innerliner film, wherein the RFL consists of a resorcinol-formaldehyde resin, a styrene-butadiene rubber, and a vinylpyridine-styrene-butadiene rubber;
   disposing a polymethylmethacrylate-grafted natural rubber onto the RFL-treated innerliner film after disposing the RFL adhesive to create a PMMA-NR treated innerliner film; and
   incorporating the PMMA-NR treated innerliner film into a tire build such that the treated innerliner film is in direct contact with a tire carcass.

2. The method of claim 1, wherein the polyamide is selected from the group consisting of polyamide 6/66, polyamide 6, polyamide 66, polyamide 6/12, polyamide 6/10, polyamide 11, polyamide 12, and nylon-MXD6.

3. The method of claim 1, wherein the polyamide is polyamide 6/66.

4. The method of claim 1, wherein the α-olefin graft copolymer is derived from ethylene and a second α-olefin, and the α-olefin graft copolymer is grafted with an anhydride of an α, β-unsaturated carboxylic acid.

5. The method of claim 1, wherein the α-olefin graft copolymer is derived from ethylene and 1-octene, and the α-olefin graft copolymer is grafted with units derived from maleic anhydride.

6. The method of claim 1, wherein the ionomer is an at least partially neutralized salt of a copolymer derived from ethylene and an α, β-unsaturated monocarboxylic acid.

7. The method of claim 1, wherein the ionomer is an at least partially neutralized zinc salt of a copolymer derived from ethylene and methacrylic acid.

8. The method of claim 1, wherein the polymeric amine is a polyethylene imine.

9. The method of claim 1, wherein the blend comprises:
   from 50 to 70 parts by weight of polyamide;
   from 10 to 30 parts by weight of the α-olefin graft copolymer; and
   from 10 to 30 parts by weight of the ionomer.

* * * * *